June 30, 1970  J. A. CUNNINGHAM  3,517,785
AUTOMATIC BRAKE ADJUSTER MECHANISM
Filed Oct. 15, 1968  3 Sheets-Sheet 2
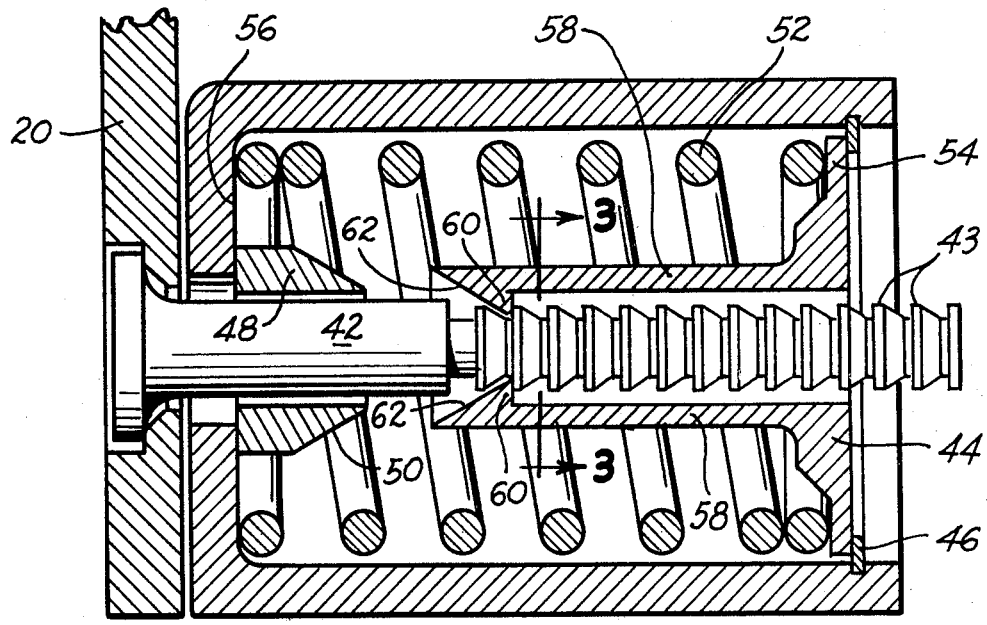
FIG_2
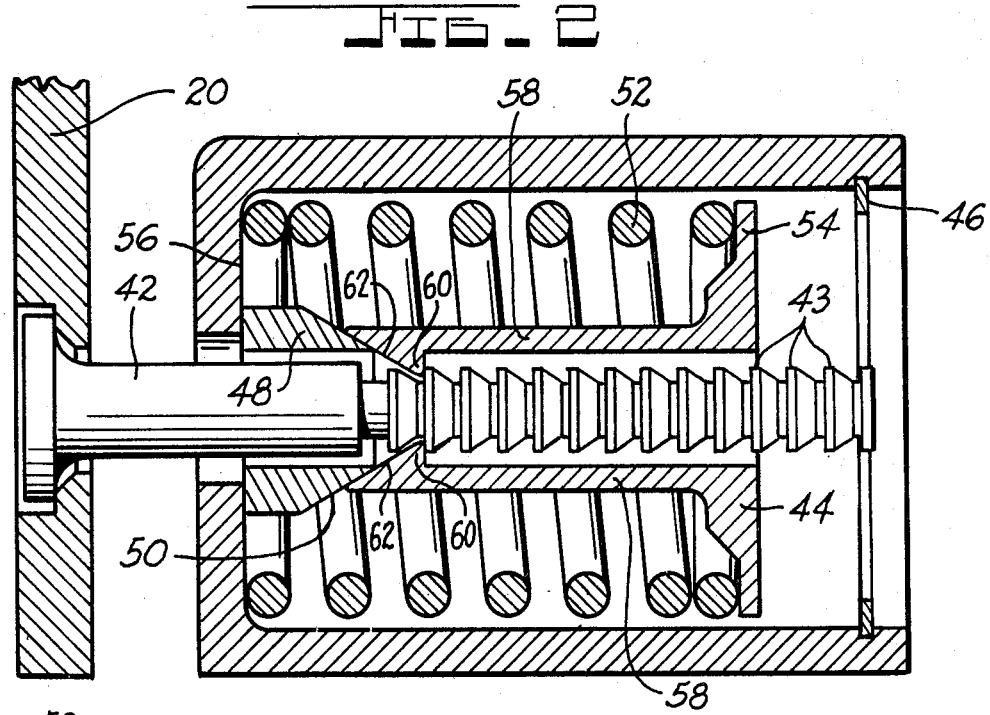
FIG_4
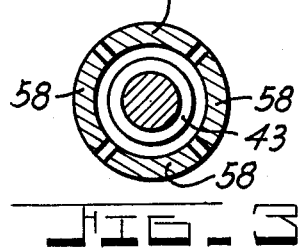
FIG_3
INVENTOR.
JOSEPH A. CUNNINGHAM.
BY
*William N. Antonis*
ATTORNEY.

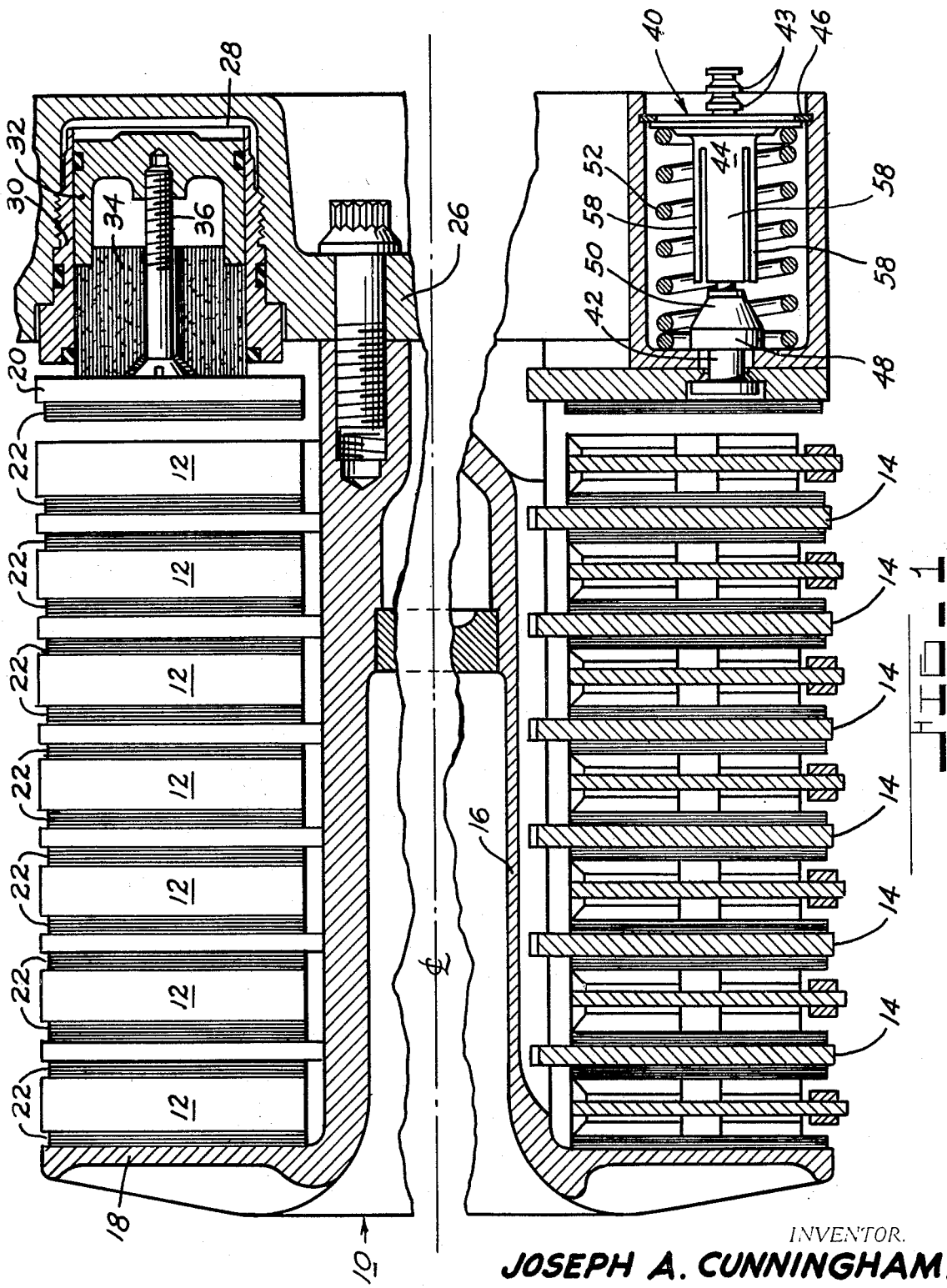

June 30, 1970   J. A. CUNNINGHAM   3,517,785
AUTOMATIC BRAKE ADJUSTER MECHANISM
Filed Oct. 15, 1968   3 Sheets-Sheet 3

INVENTOR.
JOSEPH A. CUNNINGHAM.
BY
William N. Antonis
ATTORNEY.

United States Patent Office 3,517,785
Patented June 30, 1970

3,517,785
AUTOMATIC BRAKE ADJUSTER MECHANISM
Joseph A. Cunningham, South Bend, Ind., assignor to The Bendix Corporation, a corporation of Delaware
Filed Oct. 15, 1968, Ser. No. 767,758
Int. Cl. F16d 65/52, 55/14
U.S. Cl. 188—196                           7 Claims

ABSTRACT OF THE DISCLOSURE

The following relates to an automatic brake adjuster mechanism for use with an aircraft disc brake wherein a clamping mechanism is utilized to incrementally determine the released position of the pressure plate. The clamping mechanism is of the ratchetting type wherein the ratchet teeth are formed on the adjuster pin and the detents for engaging the ratchet teeth are formed on the spring follower.

BACKGROUND OF THE INVENTION

In the construction of the typical disc-type brake, there is provided a number of interleaved rotor and stator members, some of which are lined with suitable friction material. At one side of the "stack" of rotors and stators is a fixed backing plate against which the stack of rotors and stators is compressed, and at the opposite side of the stack is a pressure plate which bears against the stack of rotors and stators and presses them together and against the backing plate. The rotors, stators, and pressure plate are all axially movable to permit their interengagement. Since the pressure plate has a maximum axial movement, adjustment of the release position of this plate is, in effect, an adjustment of the brake as a whole.

SUMMARY OF THE INVENTION

Accordingly, it is an object of this invention to provide a brake adjuster mechanism which will automatically adjust the position of the pressure plate for the next brake application.

Another object of this invention is to provide an automatic brake adjuster mechanism which will be more efficient and reliable in operation and more simple in construction than comparable type mechanisms. A further object of the present invention is to control the automatic brake adjustment by means of a simple ratchetting type clamping device which determines the released position of the pressure plate.

More specifically, it is an object of this invention to provide a ratchet-type automatic brake adjuster mechanism which includes an adjuster pin having a plurality of axially spaced ratchet teeth, a spring follower having a plurality of axially extending spring-like fingers with detents on the ends thereof for engaging one of the ratchet teeth, and a fixed release bushing which upon being contacted by the follower fingers causes them to expand and become disengaged from one of the adjuster pin ratchet teeth and to subsequently engage the next adjacent ratchet tooth.

The above and other objects and features of the invention will become apparent from the following description of the mechanism taken in connection with the accompanying drawings.

BRIEF DESCRIPTION OF THE DRAWINGS

FIG. 1 is a fragmentary axial sectional view taken through a disc brake incorporating the invention;

FIG. 2 is an enlarged sectional view of the automatic brake adjuster mechanism shown in FIG. 1 with the pressure plate shown in its original position prior to a brake application;

FIG. 3 is a sectional view taken along line 3—3 of FIG. 2; and

FIGS. 4, 5, and 6 are sectional views, similar to that of FIG. 1, which sequentially show an incremental adjustment of the pressure plate.

DESCRIPTION OF THE PREFERRED EMBODIMENT

Figure 5:
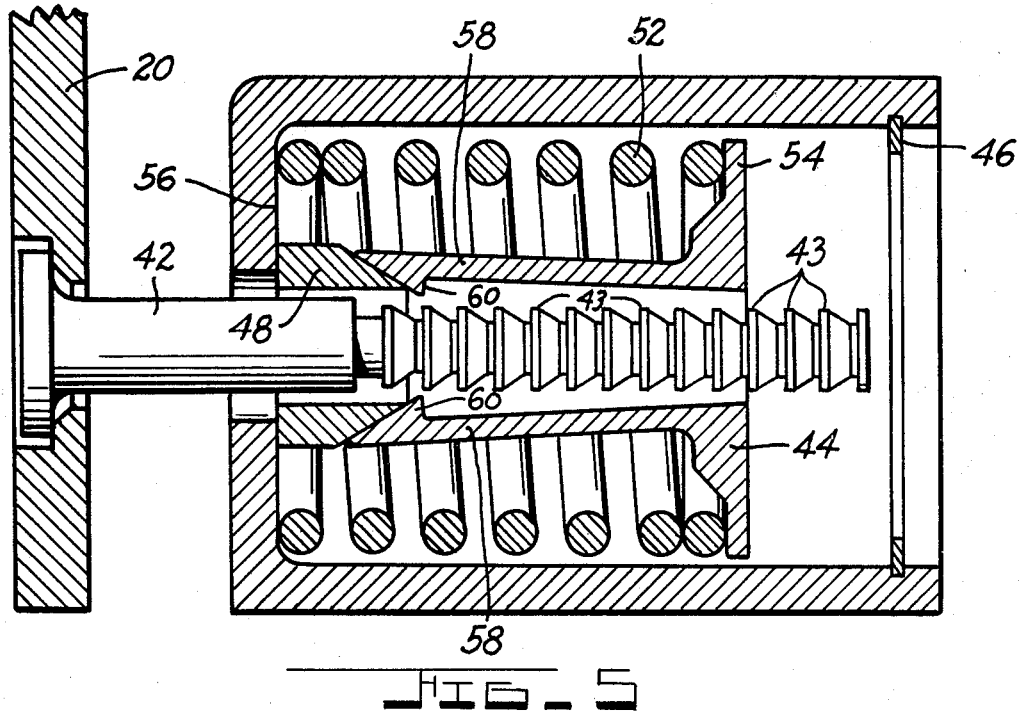
Figure 6:
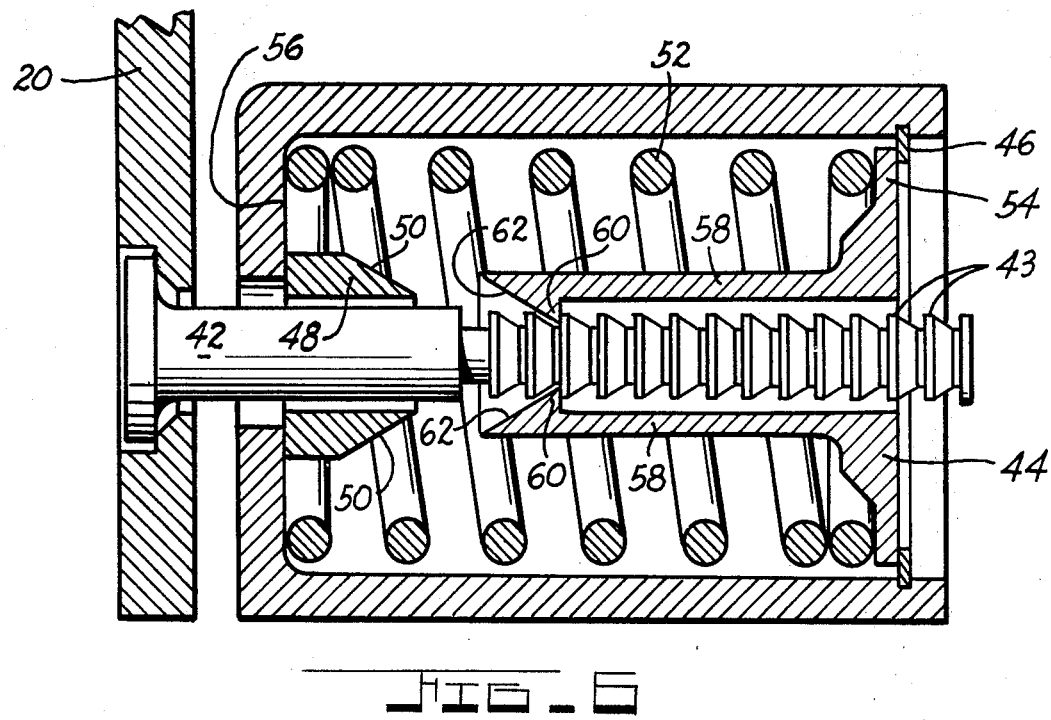

Referring to FIG. 1, it will be seen that the numeral 10 designates, generally, an aircraft brake of the disc-type construction. The brake consists of a plurality of interleaved rotors 12, which are splined to and are rotated by the aircraft wheel (not shown), and stators 14, which are splined to a non-rotatable torque tube 16. Both the rotors and stators are movable axially and are sometimes referred to as a brake "stack." It is the frictional engagement of these relatively rotatable rotors and stators which produces the braking action on the aircraft wheel. At one side of the stack is an upturned flange 18 of the torque tube 16 which is hereinafter referred to as a backing plate. At the other side of the stack is a pressure plate 20, the purpose of which is to clamp the rotors 12 and stators 14 together by thrusting at one side of the stack and forcing the entire stack against the backing plate 18.

Pressure plate 20, each of the stators 14, and the backing plate 18, have friction material lining 22 provided thereon. The lining is often formed in segments and is individually attached by rivets, or the like to its associated mounting structure. Neither the composition, arrangement, nor mounting of the friction segments forms an essential part of the present invention.

Adjacent the pressure plate 20 is a carrier plate 26 which is connected to the axle (not shown) through any suitable means. The carrier contains a plurality of fluid motors 28 (only one of which is shown), each of which includes a protective sleeve 30 threaded to the carrier, and a piston 32 located and slidable in the sleeve. A block of insulating material 34 is secured to the head end of the piston by a threaded pin 36 for protecting the hydraulic brake fluid from the heat generated during braking.

Also mounted on the carrier plate 26 are a plurality of automatic brake adjuster mechanisms designated generally by the reference numeral 40. Each adjuster mechanism includes an axially extending ratchet-type positioning member 42 having a plurality of axially spaced ratchet teeth 43 formed thereon, which is suitably secured to the pressure plate 20. An axially movable sleeve-type spring follower 44 is movable between a first fixed stop means formed by a retaining ring 46 and a second fixed stop means formed by an annular bushing 48 having a conically tapered surface 50 thereon. A return spring 52 is compressed between an outwardly extending flange 54 formed at one end of the spring follower 44 and a shoulder 56 formed on the carrier. The spring follower 44 includes a plurality of axially extending finger-like springs 58 each of which has a detent 60 extending therefrom for engaging one of the ratchet teeth 43, and a tapered surface 62 which engages the tapered surface of the bushing 48 when the follower moves into contact with the bushing during a brake application. It will be noted that the faces of the ratchet teeth and detents are alternately straight sided for locking in one direction and ramp sided to enable initial assembly of the spring follower onto the adjuster pin.

Referring to FIGS. 2–6, wherein the adjuster mechanism of FIG. 1 is more clearly illustrated, it will be seen that during a brake application, that is, when pressure is applied through actuation of the fluid motors 28, the pressure plate 20 will be moved from the position shown in FIG. 2 to the positions shown in FIGS. 4 and 5. During such movements the detents 60 which are in engagement with one of the ratchet teeth 43 will permit concomitant and equal axial movement of the adjuster pin 42 and the spring follower 44 until the follower bottoms on the release bushing 48, that is, when the tapered surface 62 of the finger-like springs 58 engage the tapered surface 50 on the bushing. When this occurs continued movement of the pressure plate and adjuster pin causes the finger-like springs to move radially outwardly, as shown in FIG. 5, until the detents become disengaged from the previously engaged ratchet tooth, at which time the pressure plate and adjuster pin are free to move independent of and axially relative to the spring follower. Such independent movement changes the axial relationship between the adjuster pin and the spring follower so that when the spring follower moves away from the bushing 48, the detents will engage the next adjacent ratchet tooth.

Thus, the running clearance, that is, the amount of the return travel of the pressure plate 20 after release of the braking force is determined by the available travel of the spring follower between the first and second stops 46 and 48, respectively. Therefore, as the braking components wear, the pressure plate travel will be able to exceed that which is available to the spring follower. This difference in travel is permitted by the relative movement between the adjuster pin and spring follower after the detent on the follower are caused to release the adjuster pin, and the spring 52 moves the follower to the right so that the detents 60 engage the next adjacent ratchet tooth. This movement of the detents from one ratchet tooth to the next ratchet tooth occurs during the brake application. Upon release of the braking pressure, the return spring will retract the pressure plate only the distance which the spring follower can move to the first stop 46. In this manner the mechanism automatically provides for a predetermined incremental brake clearance.

The several practical advantages which flow from the above-described simple, compact, unitary, adjustable mechanism are believed to be obvious and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of components without departing from the spirit of the invention. For example, although the invention is described in conjunction with a disc-type brake in which laterally movable relatively rotatable friction members are forcibly engaged during a brake application, it will be appreciated that the invention is also usable with other braking devices. Accordingly, I do not desire to be limited to the specific embodiment disclosed herein primarily for purposes of illustration, but instead desire protection falling within the scope of the appended claims. Having thus described the various features of the invention, what I claim as new and desire to secure by Letters Patent is:

1. In a brake having an axially fixed member and an axially movable member which moves a distance at least partially dependent upon the amount of brake wear, an automatic adjuster mechanism for automatically changing the released position of said axially movable member to maintain a predetermined brake clearance comprising first and second fixed stop means operatively connected to said fixed member, a sleeve-type spring follower axially movable between said first and second stop means, an axially extending ratchet-type positioning member located within and extending through said spring follower, said positioning member being secured to said axially movable member, a return spring loacted without said spring follower, said spring being compressed between said follower and fixed abutment means carried by said fixed member, detent means operatively connected to said follower for engaging said ratchet-type positioning member at a first location so as to permit concomitant and equal axial movement of said positioning member and said follower during a brake application until said follower has moved from said first to said second stop means, means formed on said second stop means for cuasing said detent means to release said positioning member after said spring follower engages said second stop means and moves axially with respect thereto to thereby permit independent axial movement of said positioning member relative to said follower and detent means, said continued independent axial movement of said positioning member causing said detent means to engage said ratchet-type positioning member at a second location so that the axial relationship between said positioning member and said follower will be changed for the next brake application.

2. The structure, as defined in claim 1, wherein said ratchet-type positioning member includes a plurality of axially spaced ratchet teeth which are progressively engaged by said detent means upon axial movement of said positioning member relative to said follower.

3. The structure, as defined in claim 2, wherein said follower includes axially extending finger-like spring means having said detent means located at the end thereof, said finger-like spring means being caused to move radially outwardly upon contacting said second stop means and moving axially with respect thereto.

4. The structure, as defined in claim 3, wherein said second stop means includes a member having a first tapered surface and said finger-like means has a mating second tapered surface for engaging and sliding along said first tapered surface.

5. The structure, as defined in claim 4, wherein said second stop means member is an annular bushing through which said positioning member extends, said bushing having a conically tapered surface thereon.

6 The structure, as defined in claim 5, wherein said finger-like means includes a plurality of finger-like springs each of which has a tapered surface at the end thereof for engaging and sliding along the tapered surface of said bushing.

7. The structure, as defined in claim 6, wherein said detent means includes a detent extending from each of said finger-like springs.

References Cited

UNITED STATES PATENTS

| 2,939,553 | 6/1960 | Turek | 188—196 |
| 3,434,574 | 3/1969 | Barone | 188—72 |
| 3,458,017 | 7/1969 | Szymski | 188—196 |

DUANE A. REGER, Primary Examiner

U.S. Cl. X.R.

188—72